US005253717A

United States Patent [19]
Roush et al.

[11] Patent Number: 5,253,717
[45] Date of Patent: Oct. 19, 1993

[54] FOLDABLE AGRICULTURAL IMPLEMENT

[75] Inventors: Daniel E. Roush, Niles; Robert A. Klaviter, Jr., Lockport, both of Ill.

[73] Assignee: Case Corporation, Racine, Wis.

[21] Appl. No.: 828,292

[22] Filed: Jan. 30, 1992

[51] Int. Cl.⁵ .............................................. A01G 63/32
[52] U.S. Cl. ...................................... 172/311; 172/456
[58] Field of Search ............... 172/310, 311, 456, 459, 172/776; 280/656, 412

[56] References Cited

U.S. PATENT DOCUMENTS

| | | | |
|---|---|---|---|
| 4,034,623 | 7/1977 | Boone et al. | 172/311 |
| 4,042,044 | 8/1977 | Honnold | 172/311 |
| 4,172,537 | 10/1979 | Gandrud et al. | 172/311 |
| 4,360,215 | 11/1982 | Nohl et al. | 172/311 |
| 4,366,867 | 1/1983 | Filbrun | 172/311 |
| 4,418,762 | 12/1983 | Page | 172/311 |
| 4,664,202 | 5/1987 | Applequist et al. | 172/311 |
| 4,723,787 | 2/1988 | Hadley et al. | 172/311 |
| 4,821,809 | 4/1989 | Summach et al. | 172/311 |
| 4,862,758 | 9/1989 | Magee . | |
| 5,024,279 | 6/1991 | Warner et al. . | |
| 5,024,456 | 6/1991 | Hadley et al. | 172/311 |
| 5,062,489 | 11/1991 | Adee | 172/311 |

*Primary Examiner*—David H. Corbin
*Assistant Examiner*—Spencer Warnick
*Attorney, Agent, or Firm*—Rudnick & Wolfe

[57] ABSTRACT

An agricultural implement having main and wing sections which are joined by a folding mechanism. The folding mechanism includes a first pivot connection for allowing generally horizontal pivoting movement of the wing section between a field working position and a folded position. In either position, the wing section remains in essentially the same plane as the main section. The folding mechanism further includes a second pivot connection whereat the sections are joined to each other and which allows independent vertical movement of the wing section relative to the main section. The folding mechanism further includes limit stops for limiting relative movement between the wing and main sections. Moreover, the agricultural implement can include a driver for effecting powered movement of the wing section relative to the main section.

16 Claims, 5 Drawing Sheets

FOLDABLE AGRICULTURAL IMPLEMENT

FIELD OF THE INVENTION

The present invention relates to agricultural implements of the draft type including a main section and at least one wing section and, more particularly, to a hinge connection therebetween allowing the wing section to move relative to the center section between a laterally extended position and a folded position and furthermore allows the wing section to independently move vertically relative to the center section to compensate for uneven terrain conditions over which the implement moves.

BACKGROUND OF THE INVENTION

The development of larger and more powerful farm tractors has allowed agricultural implements such as cultivators and the like, to also increase in size. As will be appreciated, the larger size agricultural implements permit working of increasingly larger swatches of a field during each pass thereover. Thus, multi-sectional agricultural implements have been developed including a wheeled center or main section and one or more wheeled lateral wing sections connected on opposite lateral sides of the main section.

The central or main section of the implement is of an appropriate narrow width to pass through gate openings or along roads and highways. When the wing section is arranged laterally adjacent to the main section, however, it is often difficult to move such an implement through fence gates or along roads or highways. To reduce its extended lateral sides, most farm implements are provided with a hinge connection between the main and wing sections.

In addition to ground working tools carried thereon, many agricultural implements are provided with relatively large material receiving hoppers. These hoppers are provided on both the main section and the wing section of the agricultural implement. Such hoppers contain particulate or liquid materials such as fertilizers and the like and are of considerable weight when full. Moreover, the configuration of the hoppers is such that they cannot be moved to an inverted position without loss of materials contained therewithin. Thus, a hinge connection which allows a wing section to be elevated to an overhead folded transport position is not suitable for use on all types of agricultural implements.

Agricultural implements having one or more rearwardly folding wing sections are also known in the art. In this form of implement, the wing section extends laterally with respect to the center section during operation, and folds rearwardly with respect to the path travelled by the tractor to provide a transporting configuration whereby the width of the implement becomes narrow enough for passage through gates and fences and for negotiation of roadways over which it is pulled by the tractor.

A problem sometimes exists with implements having rearwardly folding wing sections. Each wing section of such an implement is pivotally connected to the main or center section through a pivot mechanism including a pivot pin defining a generally vertical axis about which the wing section moves. While allowing for horizontal pivoting movement, the pivot mechanism restricts or inhibits vertical movement of the wing section relative to the center section. The rigid pivot connection between the wing and center sections fails to allow independent vertical movement of the wing section relative to the center section. Thus, when the implement is operated on hillsides or other slanted or otherwise uneven ground contours, the elevation of the wing section can adversely affect the performance of the ground engaging tools on the center section and vice versa. Of course, when the ground engaging tools on either section are removed from ground contact, the efficiency added to the implement by the laterally extended wing section is lost or substantially reduced.

Thus, there is a need and a desire for an agricultural implement having a wing section which is pivotally connected for folding movement in essentially the same horizontal plane as the center section between a folded position and a working position and wherein the pivotal connection furthermore allows independent vertical movement of the wing section relative to the center section when in a working position thereby allowing for changing ground contours.

SUMMARY OF THE INVENTION

In view of the above, and in accordance with the present invention, there is provided an agricultural implement having a main section and a wing section which are joined by a folding mechanism. The folding mechanism includes a first pivot connection for allowing horizontal pivoting movement of the wing section between a working position and a folded position. In a working position, the wing section is positioned in essentially the same horizontal plane and laterally adjacent to the main section. In a folded position, the wing section remains in essentially the same plane as the main section but is pivoted into a fore-and-aft relationship with the main section. The folding mechanism further includes a second pivot connection whereat the wing and main sections are joined and which allows for independent vertical movement of the wing section relative to the main section thereby permitting the wing section to move in response to contours of the underlying terrain when arranged in a working position.

The folding mechanism of the present invention preferably includes a pivot mounting assembly provided at adjacent ends of the sections. The pivot mounting assembly includes a pivot pin defining a generally vertical axis about which the wing section moves relative to the main section. In a most preferred form of the invention, the generally vertical axis about which the wing section horizontally pivots is fixed relative to the main section of the agricultural implement.

To facilitate positioning and movement of the wing section relative to the center section, the agricultural implement further includes a hydraulically powered assembly for effecting powered movement of the wing section through an arc of approximately 180° when moved between working and folded positions. The hydraulically powered assembly preferably includes an extendable and retractable hydraulic cylinder connected to a linkage assembly. In a most preferred form of the invention, the linkage assembly includes first and second linkages. The first linkage is pivotally connected at a first end to the wing section and is movable relative to the wing section. The second linkage is pivotally connected at a first end thereof to the main section and extends between the main section and a second end of the first linkage whereat the first and second linkages are joined by a common connector. The extendable and retractable hydraulic cylinder is likewise pivotally connected to the common connector for moving the wing section in response to extension and retraction of the hydraulic cylinder. The linkages are substantially identical and are connected to the respective sections on opposite lateral sides of the vertical axis about which the main and wing sections are connected.

The folding mechanism of the agricultural implement further includes limit stops During horizontal movement of the wing section, a portion of the folding mechanism abuts a stop on the main section when the wing section is moved from a folded transport position to a field working position. A stop is also provided to limit free vertical oscillatory movement of the wing section relative to the main section when the wing section is positioned in a field working position.

The wing section is maintained in a folded position by a latch assembly carried by the main section of the agricultural implement. As the wing section moves toward a folded position, a support on the latch assembly is positioned beneath a portion of the wing section which ultimately rests on the support to facilitate transportation of the agricultural implement.

A salient feature of the present invention concerns the provision of a folding mechanism which allows the wing section to be folded into a transport position about a generally vertical axis and furthermore allows independent movement of the wing section about a generally horizontal axis to allow the wing section to compensate for changes in ground contours over which the wing section moves as the implement is drawn across a field. The horizontal pivot about which the wing section moves is simple in construction, economical in manufacture and otherwise well suited to the purpose for which it is designed. Additional structure is provided to allow the wing section to be moved and positioned relative to the main section without requiring the operator to leave the seat of the tractor.

Numerous other features and advantages of the present invention will become readily apparent from the following detailed description, the accompanying drawings, and the appended claims.

DETAILED DESCRIPTION OF THE PREFERRED EMBODIMENT

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Figure 1:
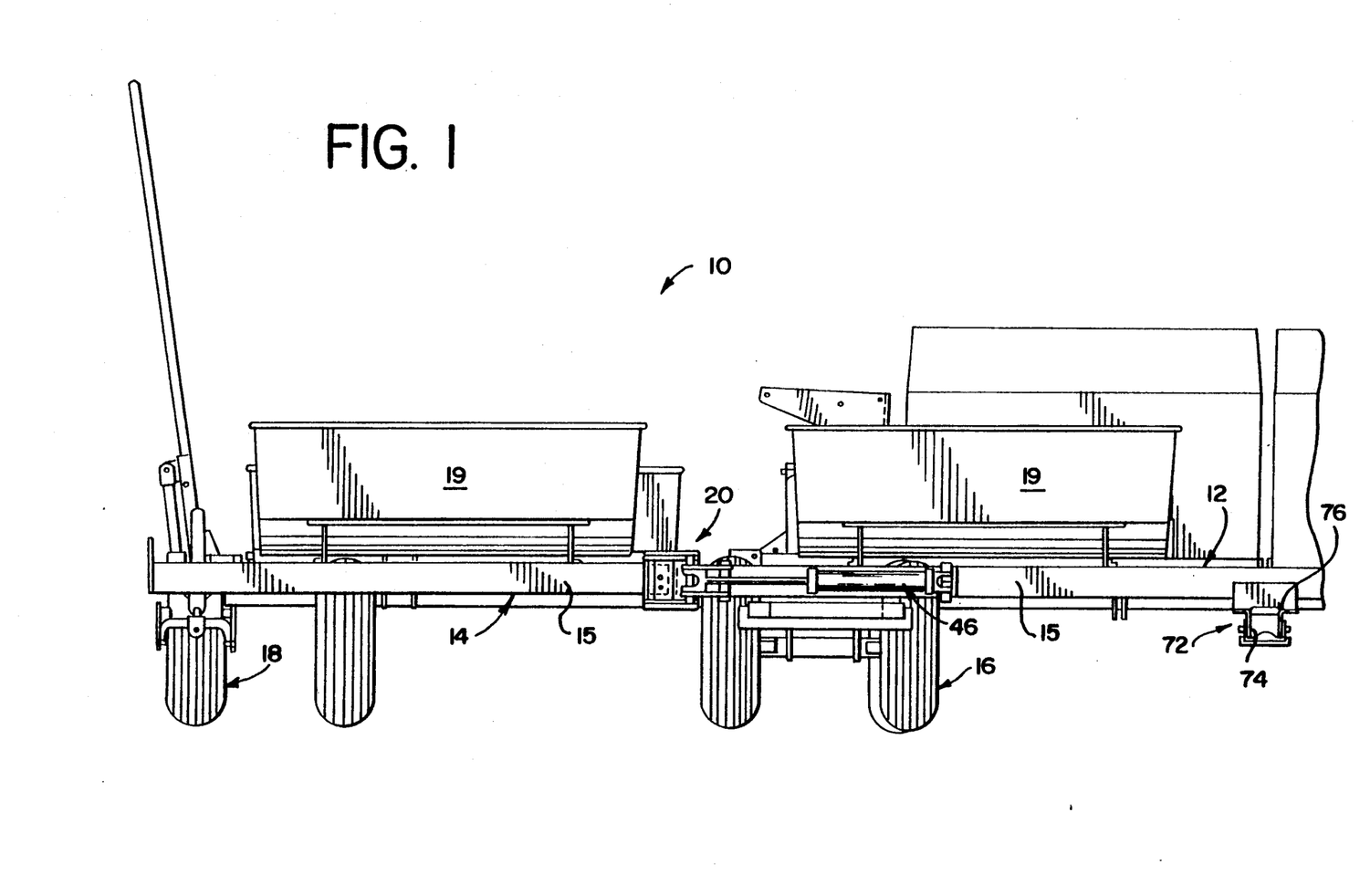
FIG. 1 is a front elevational view of a foldable agricultural implement incorporating principals of the present invention.
Figure 2:
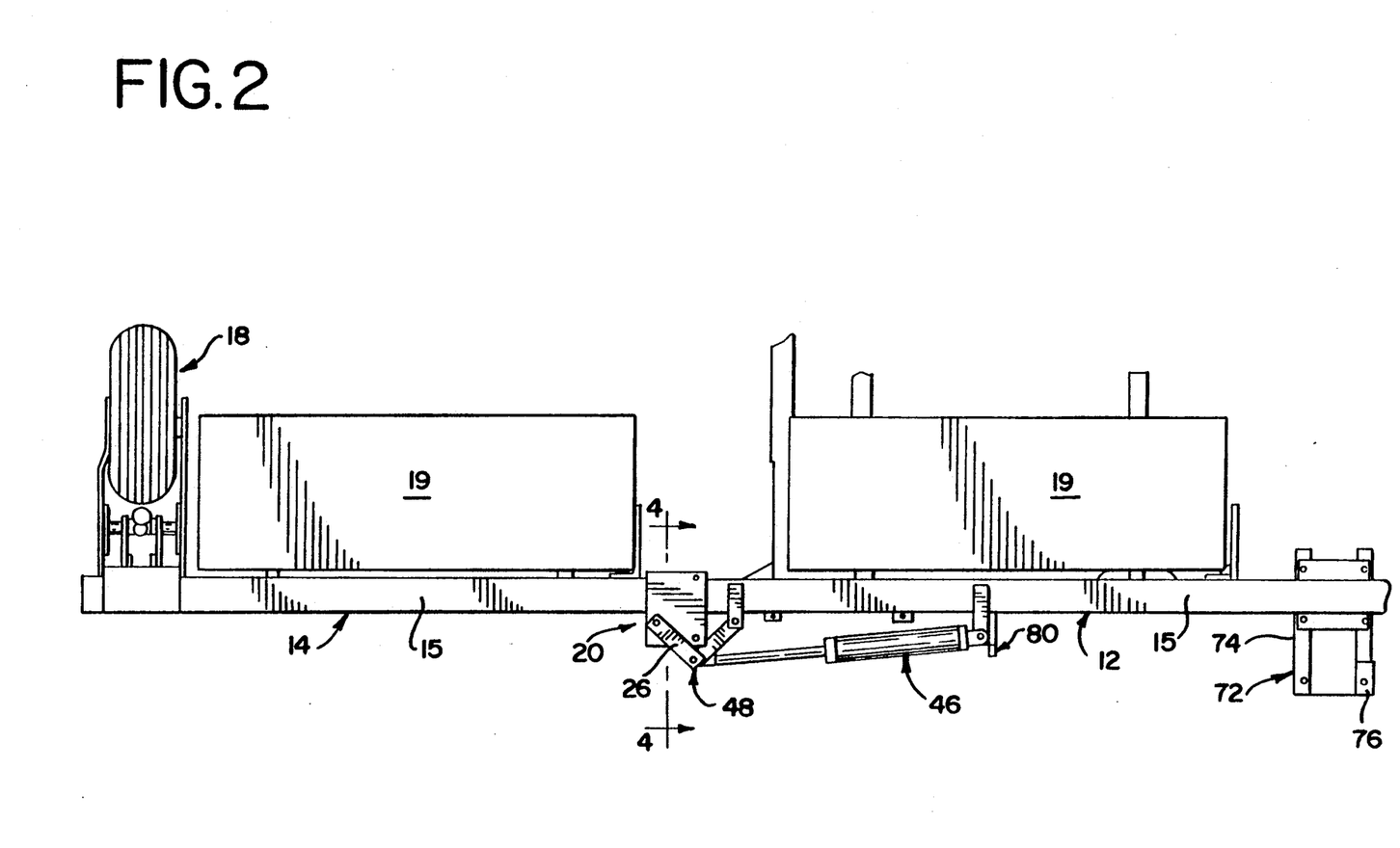
FIG. 2 is a top plan view of the foldable agricultural implement illustrated in FIG. 1.

Referring now to the drawings, wherein like reference numerals refer to like parts throughout the several views, a foldable agricultural implement shown fragmentarily in FIGS. 1 and 2 is represented in its entirety by reference numeral 10. The foldable farm implement 10 includes a main or center section 12 and at least one wing section 14, each section 12, 14 having a number of tools (not shown) depending therefrom for ground engagement.

Each section 12, 14 includes a series of rigidly interconnected frame members, generally designated by reference numeral 15, which are arranged generally parallel to the ground surface over which the implement 10 moves. One or more conventional extensible/retractable ground engaging wheel assemblies 16 vertically position and support main section 12 and the tools carried thereon relative to the ground surface. Similarly, each wing section 14 is equipped with a conventional extensible/retractable wheel assembly 18 for vertically positioning and supporting a respective wing section and the tools carried thereon relative to the ground surface. Moreover, each section 12, 14 is equipped with a conventional material receiving hopper 19 which transports and dispenses particulate or liquid matter, such as fertilizer and the like, as the implement 10 moves across the field.

In operation, the agricultural implement 10 is adapted to be connected to and towed behind a tractor or the like (not shown) such that both the main section 12 and wing section 14 move horizontally across the field. To accommodate road and/or highway transportation of the implement, the wing section 14 is horizontally pivoted to a folded or inactive position. To this end, the wing section 14 may be moved through an arc of about 180° in essentially the same plane as and into a fore-and-aft relation with the main section 12 by means hereinafter described in detail to substantially reduce the lateral width of the implement.

Figure 3:
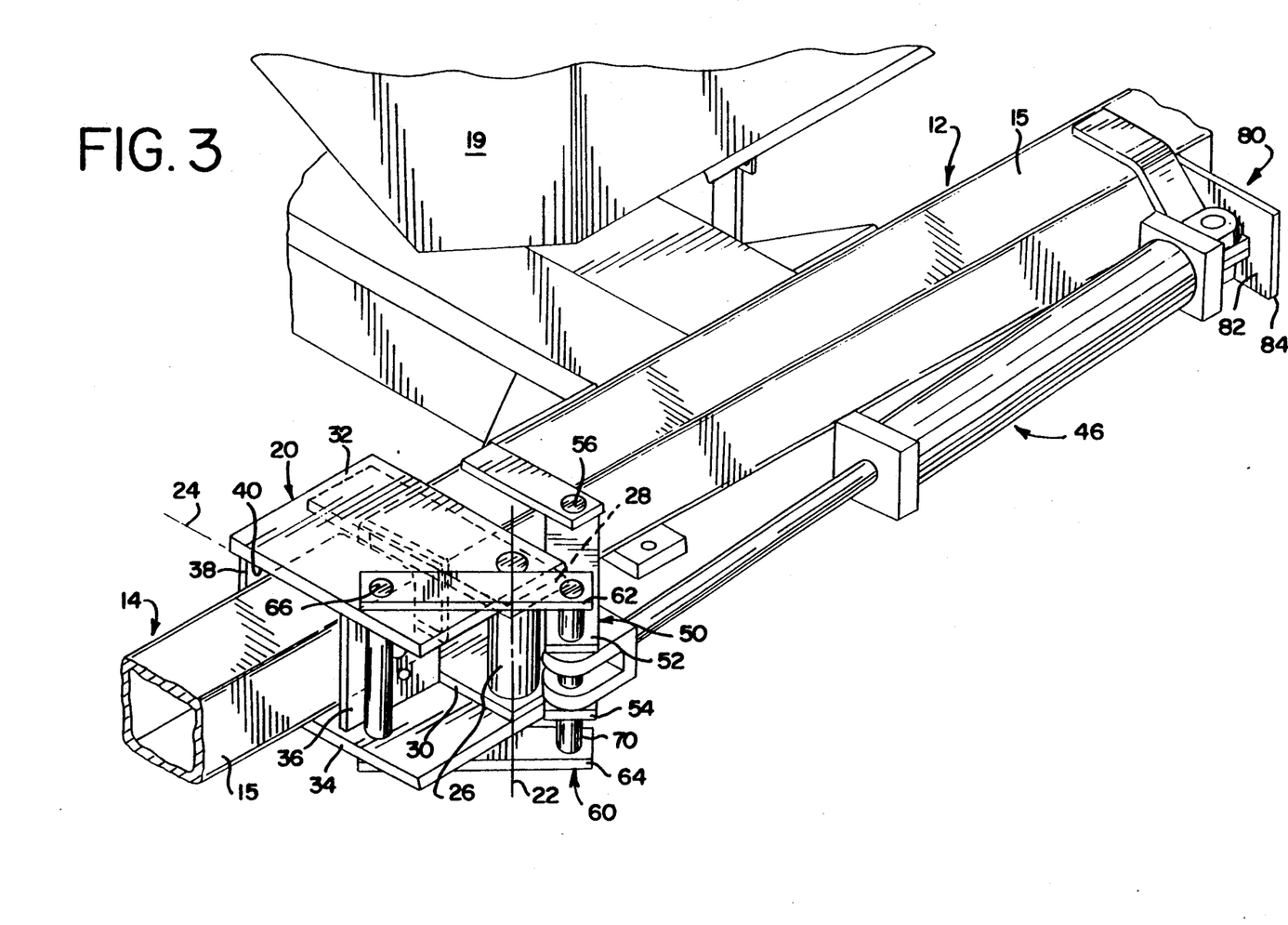
FIG. 3 is a perspective view of a folding mechanism for pivotally joining a main section and a wing section of the foldable agricultural implement illustrated in FIGS. 1 and 2.

As shown in FIG. 3, the main section 12 and wing section 14 are pivotally connected toward adjacent ends by a folding mechanism 20. As will be described in detail hereinafter, folding mechanism 20 connects the main and wing sections 12 and 14, respectively, for movement about two axes 22 and 24 extending generally normal to each other.

Figure 4:
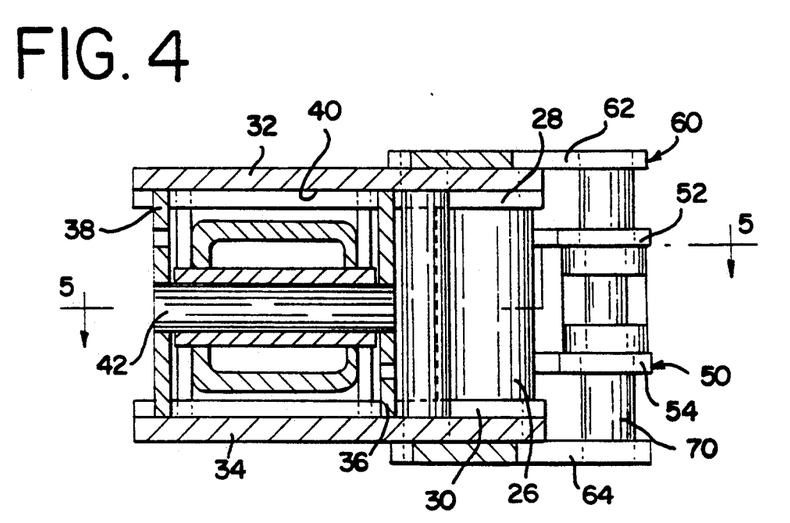
FIG. 4 is a view taken along line 4—4 of FIG. 2.

In the illustrated embodiment, and as shown in FIGS. 3 and 4, folding mechanism 20 includes a generally vertical pivot pin 26 defining the vertical axis 22 about which sections 12 and 14 are connected to each other. In the illustrated embodiment, a pair of vertically spaced cantilevered supports 28 and 30 attach to and extend from upper and lower surfaces of the main frame 12 and fix the position of pivot pin 26 relative to frame 12.

The folding mechanism 20 further includes a pair of vertically spaced and parallel lugs or plates 32 and 34 disposed toward adjacent ends of upper and lower sides of the main and wing sections 12 and 14, respectively.

Figure 5:
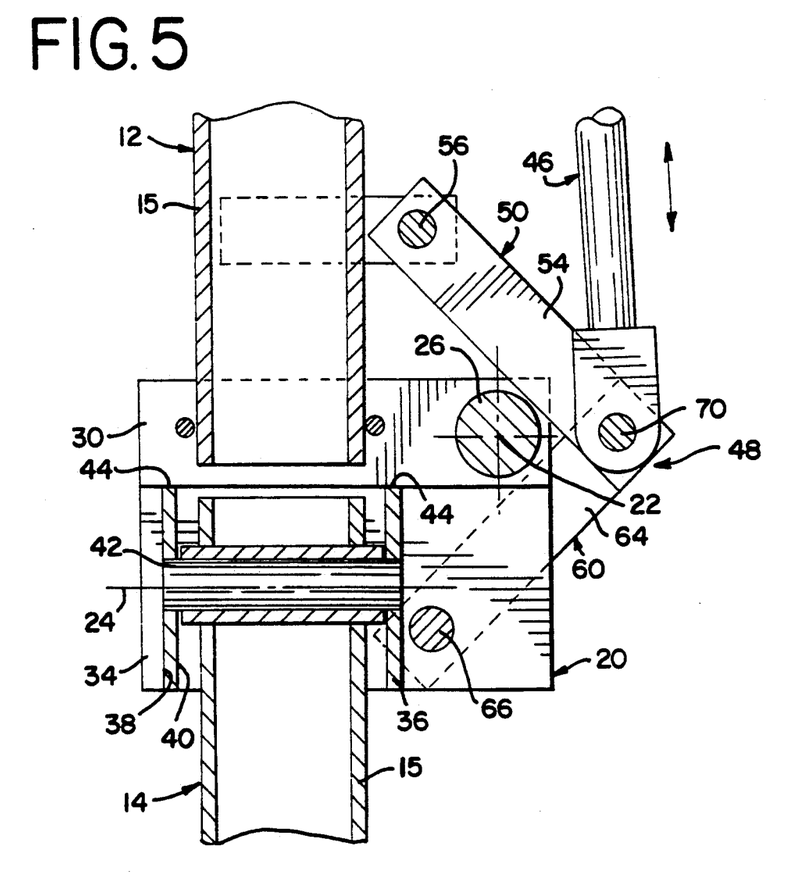
FIG. 5 is a sectional view taken along line 5—5 of FIG. 4.

Plates 32 and 34 are connected to freely and horizontally move about pivot pin 26. Plates 32 and 34 are fixedly joined to each other by vertical supports 36 and 38 to define a cavity 40 into which a portion of wing section 14 horizontally extends. As shown in FIGS. 4 and 5, a generally horizontal pivot pin 42 supported at opposite ends by plates 36 and 38 defines a fore-and-aft generally horizontal axis 24 about which sections 12 and 14 are connected to each other to permit vertical flexing movements between sections 12 and 14.

As will be appreciated, excessive vertical movement of the wing section 14 is limited by the confines of the cavity 40 defined by the folding mechanism 20. As more particularly shown in FIG. 4, the lower and upper surfaces of plates 32 and 34, respectively, act to limit the free vertical movement of the wing section 14 relative to the center section 12.

As shown in FIG. 5, the folding mechanism 20 is further configured to limit pivotal movement of the sections relative to each other when the wing section 14 is horizontally moved from a transport position to a field working position. In the preferred embodiment, a side edge 44 of one or both vertical supports 36, 38 abuts with one or both of the cantilevered supports 28, 30 on the main section 12 when the wing section 14 is moved into a field working position from a transport position.

To facilitate movement of the wing section 14 relative to the center section 12, while allowing the operator to remain in the cab region of the tractor, the agricultural implement 10 further includes an extendable and retractable driver 46 for effecting powered horizontal movement and positioning of the wing section 14 relative to the main section 12. In the preferred embodiment, driver 46 is a dual acting hydraulic cylinder-piston actuator. At one end, the actuator 46 is articulately connected to a portion of the main frame 12. At the other end, the actuator 46 is connected to a linkage assembly 48.

Linkage assembly 48 preferably includes first and second linkages 50 and 60, respectively, arranged in a toggle-like configuration. The first linkage 50 includes a pair of substantially identical vertically spaced and parallel push/pull links 52 and 54. The first end of linkage 50 and, more specifically, links 52 and 54, is connected as by pin 56 to the main section 12. The second linkage 60 includes a pair of substantially identical vertically spaced and parallel push/pull links 62 and 64. The first end of linkage 60 and, more specifically, links 62 and 64, is connected as by pin 66 to plates 32 and 34 of the folding mechanism and thereby to the wing section 14. The second linkage 60 extends from its pivotal connection at 66 with wing section 14 and is connected at a second end of the first linkage 50 whereat the first and second linkages 50 and 60 are joined by a common connector 70. Common connector 70 likewise connects the opposite end of driver 46 to the linkage assembly 48.

Figure 6:
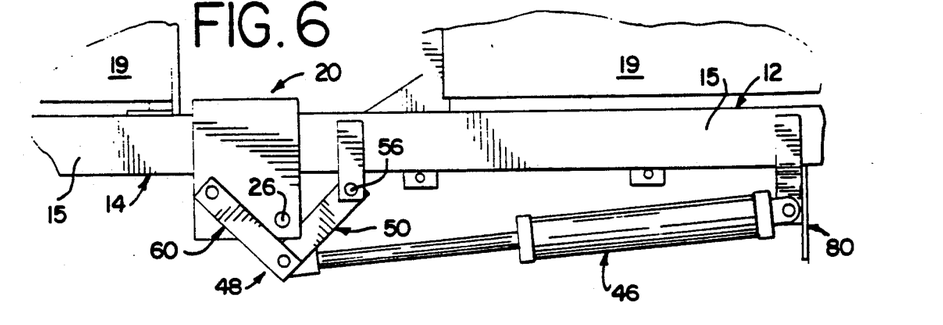
FIG. 6 is a fragmentary top plan view of the folding mechanism and illustrating a fragment of the wing section in a field working position relative to the main section.

When the actuator 46 is in the extended position as illustrated in FIG. 6, wing section 14 is positioned laterally adjacent to the main section 12 in a field working position. Notably, in a field working position, the wing section 14 is essentially the same plane as the main section 12. As will be understood, the wing section 14 is held in position under the influence of the driver 46 holding the abutting side surfaces 44 on the folding mechanism in contact with the support plates 28 and 30 on the main section 12.

Figure 7:
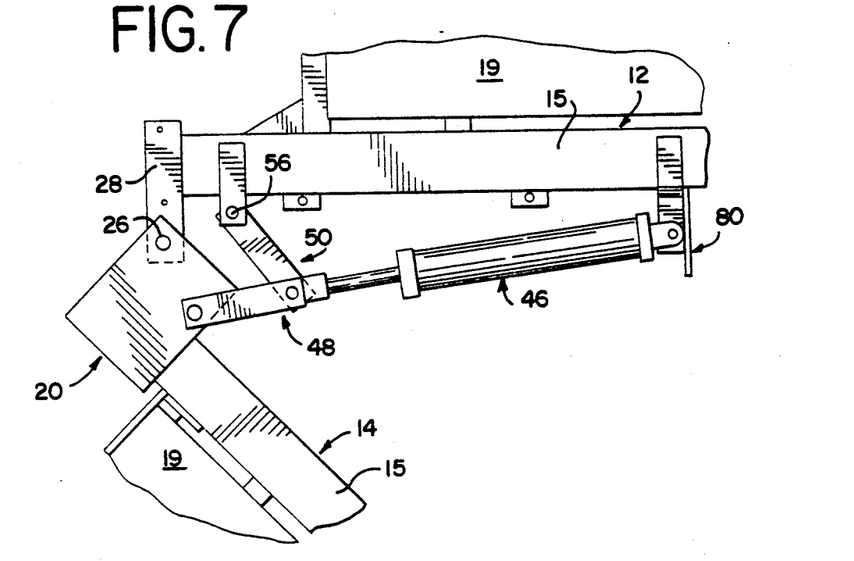
FIG. 7 is a view similar to FIG. 6 but showing the wing section being moved intermediate a field working position and a folded transport position.

When it is desired to reduce the lateral width of the implement 10, the wheel assembly 18 on the respective wing section 14 is downwardly extended to raise the respective tools out of ground engagement and allow the wing section to pivotally move horizontally in essentially the same plane as the center section 12 into a folded or inactive position through retraction of driver 46. Retraction of driver 46 causes the folding mechanism 20 to pivot about pin 26 (counterclockwise as viewed in FIG. 7). As the driver 46 retracts, linkage 50 pivots about pin 56 and linkage 60 pulls the wing section 14 in a counterclockwise direction eventually causing the wing section 14 to be arranged generally parallel to and in a fore-and-aft relationship with the main section 12 and in essentially the same horizontal plane as main section 12.

As shown in FIGS. 1 and 2, main section 12 has a latch or support assembly 72 for releasably holding a wing section 14 in a folded or transport position relative to the main or center section 12. In a preferred form, the latch assembly includes a support 74 that rigidly extends horizontally forward from section 12. As the folding wing section 14 approaches its folded position, either and/or both wheel assemblies 16, 18 on sections 12, 14, respectively, are operated such that an upper support surface 76 on support 74 underlies an underside of a foremost frame member 15 of wing section 14. As will be appreciated, the substantially universal movement allowed for by the folding mechanism 20 facilitates vertical movement of the wing section 14 relative to the support surface 76 of support 74.

Figure 8:
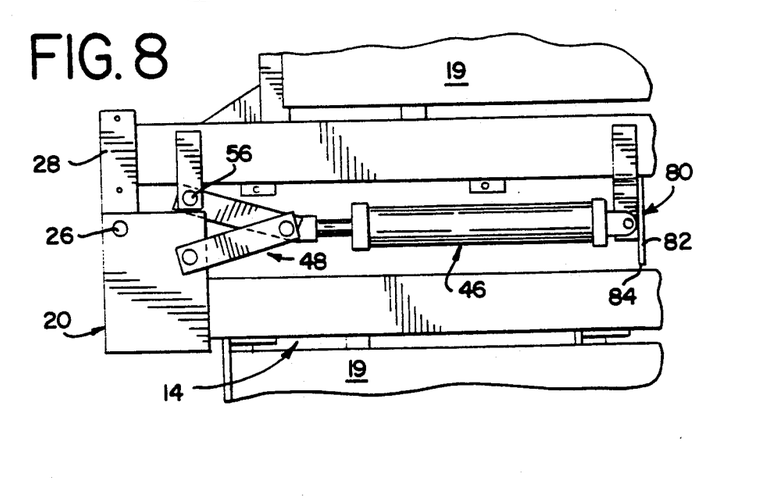
FIG. 8 is a progressive view similar to FIG. 7 but illustrating the wing section in a folded position relative to the main section.

As shown in FIGS. 3 and 8, a limit stop 80 ultimately determines the folded position of wing section 14 relative to main section 12. In the illustrated embodiment, stop 80 includes a fore-and-aft plate 82 laterally spaced from pivot 26 and extending from section 12. A stopping surface 84 of plate 82 abuts against a portion of wing section 14 in a manner limiting pivotal movement of the folding mechanism 20 about pivot pin 26.

With the wing section 14 in a folded position relative to the main or center section 12, a foremost frame member on the wing section 14 is spaced slightly above the upper surface 76 of support 74. Thereafter, the wheel assembly 18 on the respective wing section 14 is retracted thereby vertically lowering the wing section 14 to rest on support 74. The wheel assembly 18 continues to retract out of engagement with the ground surface. As will be appreciated, the vertical elevation of support 74 is sufficient to maintain the tools on the wing section 14 out of engagement with the ground surface when the wing section is in a folded position and rests on the support 74.

To move wing section 14 from a folded position to a field working position, wheel assembly 18 is extended vertically downward until the wheels there again come into contact with the ground thereby slightly lifting and releasing the wing section from the latch assembly 72. Actuator 46 is thereafter extended to cause the folding mechanism 20 to pivot about pin 26 (clockwise as viewed in FIG. 7). As driver 46 is forcibly extended, linkage 50 pivots about pin 56 and linkage 60 pushes the wing section 14 in a clockwise direction and into a field working position.

As will be appreciated, the elevation of the field over which the wing section 14 moves may be different than the elevation of the field over which the main section moves when the wing section is in an extended or field working position. A salient feature of the present invention is the provision of a second generally horizontal axis 24 which allows the wing section 14 to move vertically independent of the center section 12 and follow the contours of the underlying terrain which pass beneath the wing section 14 as compared to the contours of the terrain passing under the main section 12. Accordingly, the ground engaging tools on the wing section 14 will be allowed to operate independently of the ground working tools on the main section 12 thereby ensuring proper operation of the implement. Moreover, the folding mechanism 20 limits the free vertical movement of the wing section relative to the main section 12.

Thus, the folding mechanism 20 provided on the implement allows the wing section 14 to move about either of two axes 22 and 24 and, thus, in four different directions during operation of the implement. The folding axis 22 of the folding mechanism allowing the wing section 14 to move into a folded position relative to the main section 12 thereby reducing the overall width of the implement and without moving the hoppers 19 into a position whereat the material contained therein may spill. Moreover, the axis 24 of the folding mechanism 20 allows the wing section to vertically "float" during operation of the implement thereby assuring efficiency of the implement throughout its extended width.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A foldable agricultural implement comprising a main section for moving generally horizontal across a field, a wing section for moving generally horizontal across the field, and a folding mechanism for foldably connecting adjacent ends of said sections, said folding mechanism including a first pivot connection whereat the wing and main sections are articulately joined and which allows horizontal pivotal movement of the wing section between a working position whereat the wing section is positioned in essentially the same horizontal plane as and laterally adjacent to the main section and a folded position whereat the wing section remains in essentially the same plane as the main section but is pivoted forwardly into a generally parallel relationship with main section, said folding mechanism further including a second pivot connection whereat the wing and main sections are articulately joined and which allows for vertical oscillatory movements of the wing section relative to the main section thereby permitting the wing section to move vertically independently of the main section in response to changing contours of the underlying terrain when arranged in a working position.

2. The foldable agricultural implement according to claim 1 wherein said folding mechanism includes stops for limiting the vertical oscillatory movements of the wing section relative to the main section.

3. The foldable agricultural implement according to claim 1 wherein said folding mechanism further includes a hydraulically powered mechanism connected to a linkage assembly for effecting powered movement of the wing section through an arc of approximately 180° when moved between its working and folded positions 4. The foldable agricultural implement according to claim 3 wherein said linkage mechanism is configured as a toggle linkage mechanism including first linkage extending from the main section, second linkage extending from the wing section, and a connector for commonly connecting said first and second linkages to said hydraulically powered mechanism.

5. The foldable agricultural implement according to claim 1 wherein said main section is provided with a stop which abuts against a portion of said folding mechanism when the wing section moves into a working position.

6. A foldable agricultural implement comprising first and second sections, with each section including an elongated horizontal member, a folding mechanism for connecting the sections together about a generally vertical axis while allowing for movement of the first section between a field working position and a transport position, said first section when in the field working position being arranged in laterally extended relationship relative to said second section, said first section when in the transport position being arranged forwardly of said second section with the elongated horizontal members of the respective sections extending generally parallel to each other, said folding mechanism further including a pivot for connecting the sections to each other along a fore-and-aft generally horizontal axis to permit vertical flexing movement between said sections such that each section follows and is responsive to the contours of the underlying terrain when arranged in the field working position.

7. The foldable agricultural implement according to claim 6 wherein said folding mechanism includes pivot mounts provided at adjacent ends of said sections and a pivot pin defining the generally vertical axis about which the sections move between working and transport positions.

8. The foldable agricultural implement according to claim 7 wherein said folding mechanism further includes a powered mechanism connected between said sections for moving and positioning one section relative to the other section.

9. The foldable agricultural implement according to claim 8 wherein said powered mechanism includes a hydraulically powered motor for effecting powered movement of the sections relative to each other and a linkage assembly connected to said motor and each of said sections.

10. The foldable agricultural implement according to claim 9 wherein said linkage includes first linkage connected to and extending from the first section of the agricultural implement, second linkage connected to and extending from the second section of the agricultural implement, with said first and second linkages and said hydraulically powered motor all being connected by a common connector.

11. The foldable agricultural implement according to claim 6 wherein said folding mechanism further includes at least one stop for limiting pivotal movement of said sections relative to each other when moved from the transport position to the field working position.

12. The foldable agricultural implement according to claim 6 further including a latch for releasably holding said sections in the transport position relative to each other.

13. A foldable agricultural implement including a folding mechanism for accommodating generally horizontal folding movement of pivotally connected first and second wheeled frame sections connected by said folding mechanism, said folding mechanism comprising first linkage pivotally connected at a first end to said first frame section and movable relative to said first frame section, a second linkage pivotally connected at a first end thereof to said second frame section and extending between the second frame section and a second end of said first linkage, a connector for commonly connecting said first and second linkages and one end of an extendable/retractable actuator, an opposite end of said actuator being pivotally connected to said first frame section, with said folding mechanism being structured to respond to extension and retraction of said actuator while permitting movements of said second frame section in essentially the same horizontal plane as said first frame section between a folded position whereat the second frame section is directly in front of and extends generally parallel to the first frame section and an operational position whereat the second frame section extends laterally outward from the first frame section, and wherein the folding mechanism further includes a first pivot for connecting said first and second sections to each other about a generally vertical axis fixed relative to said first frame section and a second pivot for connecting said first and second sections to each other about a generally horizontal axis to accommodate relative vertical movements between the frame sections resulting from changing ground contours over which the sections pass.

14. The foldable agricultural implement according to claim 13 wherein said linkages are of substantially similar length and are connected to the respective frame sections on opposite lateral sides of the vertical axis about which the first and second sections are connected.

15. The foldable agricultural implement according to claim 13 further including a latch assembly for releasably holding said second frame section in the folded position relative to said first frame section, said latch assembly including a support extending from and positionable beneath at least a portion of said second frame section to vertically support said second frame section out of ground engagement and in the folded position relative said first frame section thereby facilitating transport of said implement.

16. A foldable agricultural implement comprising first and second wheeled sections, with each section having ground engaging tools carried thereby, and a folding mechanism for connecting the sections together to allow pivoting movement between the sections in any of at least four different directions, said folding mechanism including a generally vertical pivot for allowing pivoting movements of said first section between a first position whereat said first section is forwardly of and extends generally parallel to said second section and a second position whereat the first section is generally laterally aligned with the second section, and a generally horizontal pivot for allowing vertical pivoting movements between the sections in third and fourth directions independent of the pivoting movements in the first and second directions.

* * * * *